Figure 1:
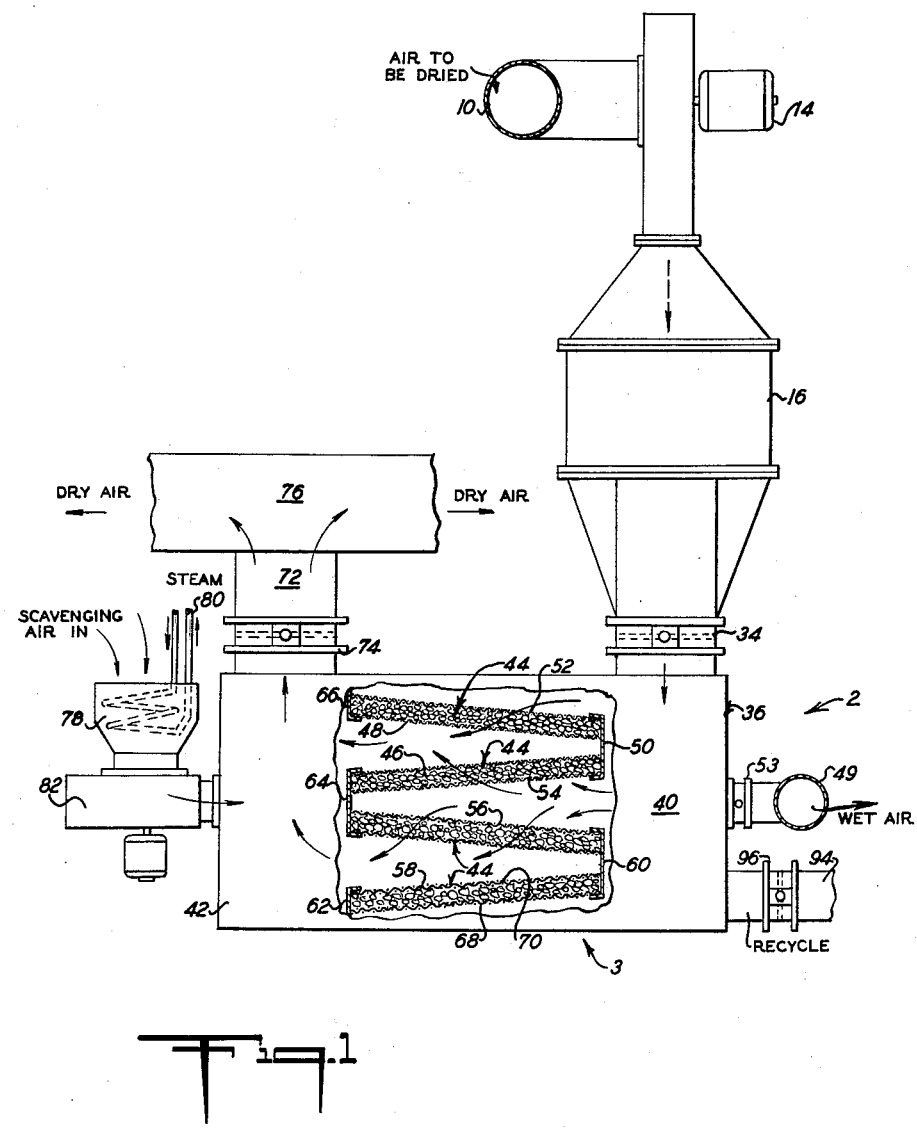

INVENTORS
GUNNAR C. F. ASKER
GERT K. A. SIGGELIN

ATTORNEY

INVENTORS
GUNNAR C. F. ASKER
GERT K. A. SIGGELIN

United States Patent Office 3,119,673
Patented Jan. 28, 1964

3,119,673
MARINE DEHUMIDIFICATION SYSTEM
Gunnar C. F. Asker and Gert K. A. Siggelin, Falls Church, Va., assignors, by mesne assignments, to Atlantic Research Corporation, Fairfax County, Va., a corporation of Virginia
Filed June 9, 1958, Ser. No. 740,836
5 Claims. (Cl. 55—20)

This invention relates to an improved dehumidification system combining refrigeration dehumidification and granular desiccant adsorption dehumidification. More particularly the present invention comprises a dehumidification system of greatly improved economy and flexibility for marine or ship dehumidification of cargo or passenger spaces, and preferably dry cargo holds, of ships; and comprises the apparatus as well as the method for operation of such dehumidification system.

The need for and advantages of dehumidification of air not only for marine passenger comfort, but primarily for protection of marine cargoes, is well recognized in the art. Dehumidification for ships, traveling in all kinds of services and drawing an ambient fresh air supply, must remove moisture from usually high relative humidity sea air, as generally available and, for a large portion of the ship dehumidification cycle during hot sunshine daylight hours, must dehumidify high temperature as well as a high relative humidity air, imposing a very great load upon the ship dehumidification system, variable somewhat, of course, with the particular ships service.

An all cooling (refrigeration type) dehumidification system does not practically reduce the temperature or corresponding dew point of the air below about 45° to 50° F., since to cool it lower, thereby depositing more moisture, requires uneconomically large condensing surfaces and relatively slow air passage in heat exchange contact with the cooling surface; or when lower heat exchanger temperatures are used rapid frosting of the refrigeration coils results, thereby reducing the heat transfer efficiency. This requires handling of comparatively larger volumes of air for removal of a fixed quantity of moisture with respect to a system where the absolute moisture content of the air were reduced to a greater degree. Hence, in terms of absolute quantity of moisture removed from the air per lb. of air necessarily handled by the system, the refrigeration method of dehumidification is relatively inefficient, because of the large quantity of air which must be handled slowly and the relatively poor dehumidification thereof, by the need for rapid heat exchange with practically dimensioned cooling coils of the refrigeration system.

It is also known to remove moisture from gas by contacting the gas with a liquid dehumidifying solution such as lithium chloride, but again, there are practical limits to the quantity of moisture that can be removed by such preferable method including, as lower limit, the vapor pressure of the dehumidifying solution and the limits to which such can be reduced by refrigeration. As a practical matter the moisture content of air treated in a liquid dehumidification system is about 20–30 gr. and accordingly that system, too, lacks economy because of the larger quantity of gas that must be handled to remove a specified quantity of moisture.

Very large quantities of moisture, down to about 5 grains per pound of air can be removed by adsorption on solid desiccant such as silica gel, but for handling the relatively large volumes of gas of the high moisture content and temperature of sea air requires large beds to retain such large quantities of moisture, including heavy power requirements for regeneration of such large beds, has rendered such system economically unattractive for marine use.

According to the present invention we have found that if high humidity and high temperature air is first cooled to a practical limit of generally not lower than 45° F. in a dehumidification system with a cooling system, which operates only intermittently and which may be by-passed when low humidity air is available, and that air refrigerated in the preliminary dehumidification is reheated in passage through a bed of granular desiccant, completing the moisture removal down to a very low value, about 5 gr., such as is only practical with granular desiccant dehumidification, great advantages including economy result in that combination. For instance, the precooled air dehumidified becomes reheated in that dehumidification to normal, whereby the desiccant is more efficient. More important, that combination is more efficient because, for equivalent moisture removal, much smaller quantities of gas need to be handled in the combined system requiring smaller apparatus, i.e. blowers, ducts, refrigeration units and desiccant units, to accommodate the reduced volumes of gas needed and necessarily handled.

The system becomes of great flexibility by removal of the refrigeration element of the combination as circumstances dictate the desirability thereof. For instance, where relatively low humidity or cold air is available, only a small dehumidification applied by the desiccant is necessary and the refrigerating unit may be by-passed or inactivated. Again, where much of the gas to be dehumidified is relatively dry recycle gas from a cargo hold, only the fresh make-up supply of highly moist sea air needs to be first refrigerated and which together with the recycle air is passed directly to the desiccant bed. Where, again, only cool air is desired for passenger comfort in port, there being no need for dehumidification of the cargo spaces, only the refrigeration system may be used. The preliminary refrigeration makes the subsequent desiccant dehumidification more efficient and operative to supply dry gas at lower temperatures by the cold gas being reheated in the desiccant bed. Also important, however, is the fact that a far drier air is produced having better dry cargo hold protective value than is available by other known dehumidification systems for ships.

The present system as a practical matter allows great economies also because it is highly flexible to inactivate a portion of the system, i.e. preliminary dehumidification by refrigeration, when the air already has below or about the moisture content produceable by preliminary refrigeration. Thus, where under unusual sea air conditions, the temperature and relative humidity is below about the range of 50 to 70° F., preliminary refrigeration is either by-passed or that refrigeration unit is inactivated. That also will be desirable sometimes, where the system is flexible to recycle some of the relatively dry cool air from the dehumidified space, to by-pass the refrigeration unit, passing the recycle directly to the desiccant dehumidifier.

Figure 2:
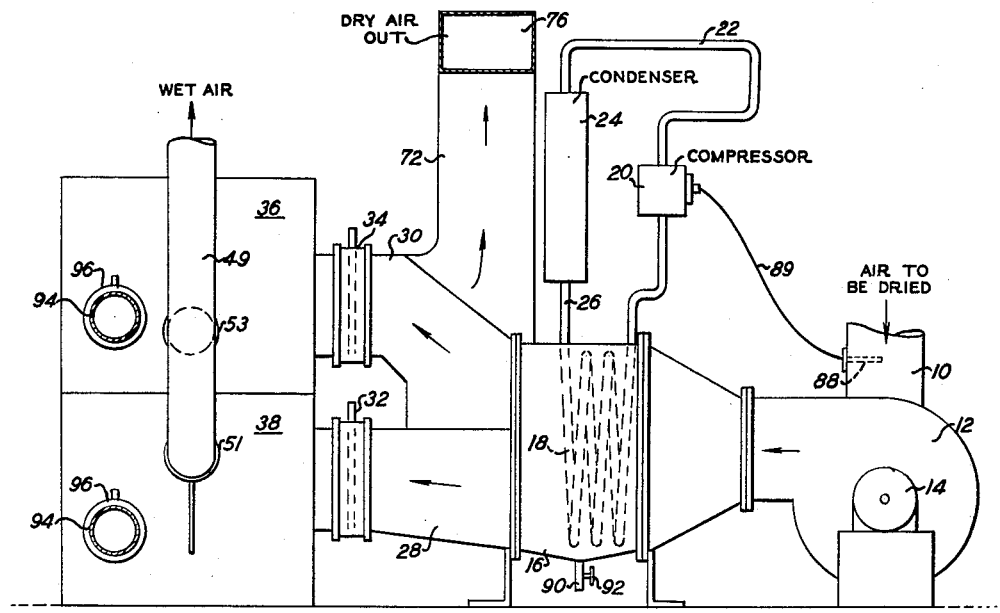
Figure 3:
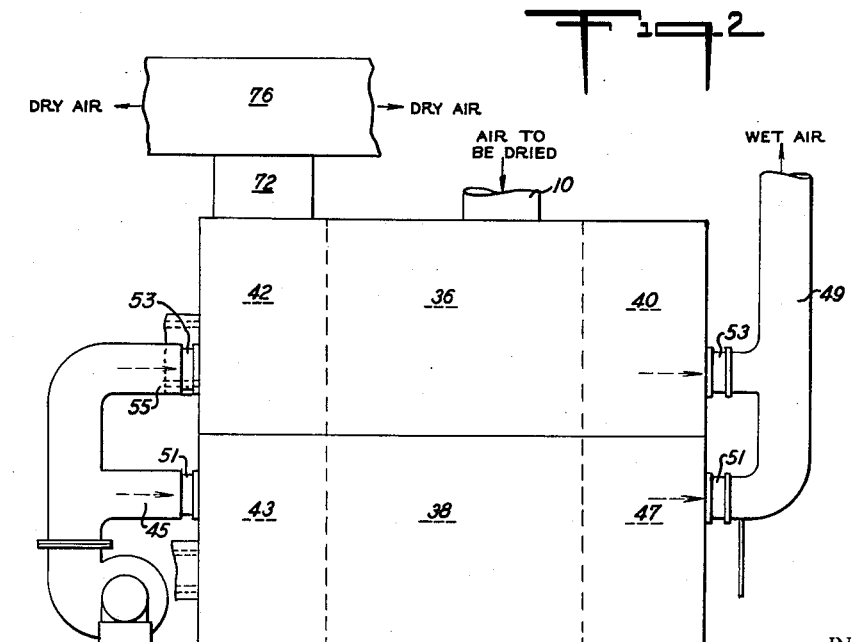

The system also has further advantages in that the air where first cooled by refrigeration is finally dehumidified in the desiccant to provide very dry air at a lower temperature, the refrigeration tending to offset the rise in temperature normally imparted by moisture removal in the desiccant bed. There are numerous other incidental advantages which will be inherent in the description which follows made in conjunction with the drawings wherein:

FIG. 1 shows a plan view of the combination system partially in section;
FIG. 2 is an elevation of the right side of FIG. 1; and
FIG. 3 is an end view in elevation of FIG. 1.
Referring to FIGS. 1–3, the gas to be dehumidified enters the system as moist, humid, and usually warm air through an inlet duct 10, entering the suction of a blower or fan 12 impelled by a motor 14, and is sent through a heat exchange unit of a refrigeration system 16. That heat exchange unit 16 comprises an elongated annular shell housing in which are disposed refrigeration coils 18 comprising the cold evaporation coils of a refrigeration system. The refrigeration system comprises a standard compressor motor 20 which compresses refrigeration gas, such as Freon, passing the hot compressed gas through a duct 22 into a condenser 24 which condenses the gas to a liquid. The liquefied refrigerant then passes through duct 26 whence it is expanded by evaporation into the coils 18 wherein the liquid expands to a gas according to standard refrigeration unit construction and of which the present drawings are merely a diagram.

The warm gas to be dehumidified, passing through the chamber 16, contacts the cold evaporator coils 18 and becomes cooled below its dew point, depositing a substantial amount of its moisture. It is preferably cooled to a temperature in the range of 45–70° F. The lower temperature limit given is that to which air can be efficiently cooled by such refrigeration coils without frosting thereof by a higher temperature differential. While more generally the air will be cooled to the range of 45–60° F. and usually between 45 and 50° F., where the temperature already is in the range of 45–70° F. the refrigeration unit will usually be inactivated whereby the coil 18 is at the same temperature of the inlet air, and the inlet air will then not be cooled at all, according to the present system.

The gas leaving the refrigeration chamber 16 is diverted through either of two ducts 28 and 30 respectively, controlled by valves 32 and 34 for passage alternately into an upper dehumidification chamber 36 or a lower dehumidification chamber 38. The gas enters the dehumidification chamber, for instance the upper one 36 as shown in FIG. 1, through a right hand plenum portion 40 passing horizontally across to the left hand side plenum 42 and, in passage, traverses narrow vertical desiccant beds 44. These beds 44 are set angularly to intercept the horizontal passage of gas. As shown, two beds 46 and 48 join in a V at the inlet end adjacent the plenum 40, the narrow end juncture of both beds being enclosed by an imperforate shield bracket 50 whereby the gas passes around both sides through the open sloping or angularly disposed opposite inlet side surfaces 52 and 54 of respective beds 48 and 46, passing entirely across each end to the center of the V, and thence from the center of the V and inner sides thereof to the left hand plenum 42 as dehumidified gas. In a similar manner, beds 56 and 58 are joined in a V through a similar imperforate shield bracket 60. The opposite legs of the V are similarly encased in imperforate brackets 62, 64 and 66 which close that outlet bed portion, thereby forcing the gas entering from the plenum 40 to traverse the bed angularly in its passage through the relatively shallow bed from side to side.

The bed construction thus shown is in itself an improved dehumidifier construction in that large surface area beds may be provided of relatively shallow depth whereby large volumes of gas may most efficiently be contacted with adsorbent silica gel distributed to expose a relatively large surface area in a dehumidifier chamber of small volume. This is effected by mounting shallow beds at an angle to the direction of gas passage, forcing the gas to be diverted in a Z for passage through the shallow bed, whereby large volumes of gas are contacted with desiccant in large surface exposed position in a small volumed chamber. Each bed in otherwise usual construction has its vertical desiccant retaining walls 68 and 70 constructed of wire between which the desiccant is disposed as a shallow bed as shown. The dehumidified gas in plenum 42 passes out of the dehumidifier 36 by way of duct 72, controlled by a valve 74, and is distributed to the cargo hold or elsewhere in the ship, as desired, by duct 76.

The gas passes through the upper dehumidifier unit 36 as described, while the lower dehumidifier unit 38 is being regenerated. For this purpose bed regeneration or scavenging air enters the regeneration gas fan suction inlet 78 and is heated to a bed regeneration temperature of 300 to 400° F. by steam passed through coils 80, and is forced by fan 82 into the lower plenum 43 by way of duct 45 of the unit 38, passing in reverse as described above through each of the angularly disposed beds 44. The hot gas removes moisture from each bed in its reverse passage, and enters the right hand plenum 47 passing out of the system by way of the duct 49 for disposal as wet regeneration gas. The ducts 45 and 49 are controlled by regeneration gas valves 51 and 53. When the upper dehumidifier unit 36 becomes exhausted and the lower one 38 has been regenerated, the valves 51 are closed and valves 53, for control of regeneration gas in the upper unit 36, are open. Hot regeneration gas then passes through the upper unit by way of duct 55 entering first plenum 42, traversing the beds in reverse as described for the lower bed, to plenum 40 and thence into moist gas disposal duct 49 by way of valve 53.

Simultaneously, gas to be dehumidified from refrigeration chamber 16 passes through duct 28, valve 32 being open for this purpose and valve 34 now being closed, and enters unit 38 for dehumidification thereof through lower plenum 47, traversing the angularly disposed lower beds, passing out through plenum 43 as dehumidified gas, leaving through an outlet duct parallel to and below duct 72 controlled by a valve similar to and below valve 74 for passage of dehumidified gas into the duct 76.

For control of the refrigeration dehumidification unit, a sensing bulb 88 is mounted in duct 10 thermostatically sensitive to the temperature of the gas therein which controls a switch of standard construction in compressor 20 by way of circuit line 89 whereby the refrigeration unit and production of cold refrigeration gas in coils 18 will be inactivated at any inlet air temperature below that set by the sensing unit 88, for instance, any inlet air temperature below the desired range of 45 to 70° F.

The moisture deposited on refrigeration coils 18 collects in the bottom of the housing 16 and may be withdrawn from time to time through pipe 90 controlled by a valve 92.

Where air may be drawn from a relatively dry source for direct recycle to the desiccant bed, such as recycling from a dry cargo hold, it may be passed directly into the plenum chamber 40 by way of duct 94 controlled by valve 96. In that recycle, the refrigeration unit 16 is by-passed for all recycle gas, and may be inactivated entirely, or even only a small quantity of make-up gas may be drawn into the system, through duct 10, recooled by coil 18, mixed with the recycle gas in plenum 40 and both passed through the dehumidifier. Of course, the system is also flexible to by-pass both of the dehumidifiers, if desired, using only the cooling system. For that purpose the dry gas outlet valves 74 are closed as well as the regeneration valves 51 and 53. The cold gas entering through plenums 40 or 47 is then passed through ducts 94 with valves 96 being open.

The system as thus described is quite versatile, but derives its great economy in operation by being useful, by possessing great flexibility, to very substantially dehumidify sea air or other usually high temperature and high moisture content air through an adsorbent desiccant bed, handling a relatively small volume of gas by first refrigerating the gas to produce a low moisture content and cool gas with a relatively economical intermediate cooling; or to by-pass that preliminary cooling entirely where low temperature and consequently low moisture content gas is naturally available. Thus, the system is economical to dehumidify gas flexibly under optimum conditions for whatever quality of air is available.

Other advantages of the system are inherent in the description as given, together with such other modifications as will occur to those skilled in the art. It is accordingly intended that the description herein be regarded as illustrative and not limiting except as defined in the claims appended hereto.

We claim:

1. A dehumidification system for ship spaces comprising the combination of a refrigeration dehumidification system having means for passing inlet air to said system, means for cooling the air and means for withdrawing the cooled and partially dehumidified air from said refrigeration dehumdification system, a granular adsorbent desiccant type dehumidification system comprising at least one bed of granular adsorbent solid desiccant, means for passing air to be dehumidified to said bed of desiccant and means for withdrawing the dehumidified air after passing through said bed of granular adsorbent desiccant, and responsive to the temperature of the inlet air for passing air serially, first through the refrigeration dehumidification system and then through the granular adsorbent desiccant dehumidification system when the inlet air is at a pre-selected high temperature, and for alternately passing the inlet air through the desiccant dehumidification system as the sole dehumidification system when the inlet air is at a lower temperature.

2. Apparatus as defined in claim 1 including means for recycling dehumidified air from a ship space to said bed of granular adsorbent desiccant.

3. A ship having dry cargo and tank spaces combined with means for dehumidifying sea air and passing dehumidified sea air to said spaces, said means for dehumidifying sea air comprising in combination a refrigeration dehumidification system having an inlet communicating with the sea air, means for cooling the sea air therein and means for withdrawing the cooled and partially dehumidified air from said refrigeration dehumidification system, a granular adsorbent bed desiccant type dehumidification system comprising at least one bed of granular adsorbent solid desiccant material, means for passing air to be dehumidified to said bed of granular adsorbent desiccant and means for withdrawing the dehumidified air after passing through said bed of granular adsorbent desiccant and means for passing the granular desiccant dehumidified air to said ship tank and dry cargo spaces, means for alternately interconnecting said dehumidification systems to pass air serially to be dehumidified first through the refrigeration dehumidification system and then, after partial dehumidification, through the granular adsorbent desiccant dehumidification system, said systems being interconnected only when the sea air to be dehumidified is at a temperature above 70° F., said refrigeration system being operative to reduce the temperature of said sea air to the range of 45 to 70° F., said systems being alternately disconnected to bypass said refrigeration dehumidification system, passing ambient sea air directly to said granular adsorbent desiccant type dehumidification type system when the ambient temperature of said sea air is below 70° F., and means for recycling air from said ship space only to said granular desiccant adsorbent bed.

4. The method of removing substantially all the moisture from ambient sea air for ventilation of dry cargo and tank spaces of ships therewith, comprising first passing ambient sea air when its temperature is below 70° F. through a granular adsorbent bed of desiccant material to remove substantially all of the moisture therefrom, passing the said dry air to the dry cargo and tank spaces of the ship and continuously recycling partially dehumidified air from the said dry cargo and tank spaces of the ship to said granular bed of adsorbent material to maintain the air in said spaces substantially dry, and alternately, when the temperature of the ambient sea air is above 70° F., passing said ambient sea air first through a refrigeration type dehumidifier to cool the air to the range of 45° to 70° F., thereby cooling and removing substantial quantities of moisture from the sea air, and then passing said cool air through said bed of granular adsorbent desiccant material to further reduce the moisture content thereof to substantial dryness, passing the dry air to said cargo and tank spaces of the ship and recycling partially dehumidified air from said ship spaces only through said bed of granular adsorbent desiccant material.

5. A method for dehumidifying air for ventilation of dry cargo and tank spaces of a ship therewith, comprising passing ambient sea air to be dehumidified through a refrigeration type dehumidifier when its temperature is above 70° F. to cool the temperature thereof to the range of 45° to 70° F., as a source of dehumidified air, alternately passing ambient sea air when its temperature is below 70° F. as well as recycle partially dried air from the said dry cargo and tank spaces through a granular solid adsorbent desiccant bed to reduce the air to a substantially low moisture content and then passing the thus formed dry air to said dry cargo and tank spaces, and as a third alternate, passing ambient sea air at a temperature above 70° F. first through a refrigeration type dehumidifier to cool the temperature thereof to a range of 45° to 70° F. and then passing the cooled air in series through the said granular adsorbent solid desiccant type dehumidifier to further reduce the moisture content to a substantially low value and then passing that dry air to the said dry cargo and tank spaces of the ship while recycling air from the said ship spaces for further dehumidification only through the said granular adsorbent solid desiccant dehumidifier.

References Cited in the file of this patent

UNITED STATES PATENTS

| | | |
|---|---|---|
| 1,518,162 | Parkinson | Dec. 9, 1924 |
| 1,721,589 | Donaldson | July 23, 1929 |
| 1,863,579 | Morse | June 21, 1932 |
| 1,999,142 | Myers | Apr. 23, 1935 |
| 2,075,036 | Hollis | Mar. 30, 1937 |
| 2,124,932 | Stark et al. | July 26, 1938 |
| 2,175,469 | Kaufman | Oct. 10, 1939 |
| 2,257,478 | Newton | Sept. 30, 1941 |
| 2,681,182 | McGrath | June 15, 1954 |
| 2,699,922 | Herbst | Jan. 18, 1955 |
| 2,823,758 | Asker | Feb. 18, 1958 |

FOREIGN PATENTS

| | | |
|---|---|---|
| 410,078 | Germany | of 1924 |